United States Patent
Yates et al.

(10) Patent No.: US 11,066,964 B2
(45) Date of Patent: Jul. 20, 2021

(54) ACTUATION ASSEMBLY AND METHODS OF OPERATION THEREOF

(71) Applicant: Camcon Auto Limited, Cambridge (GB)

(72) Inventors: David Yates, Warwick (GB); Richard Tyrrell, Pulborough (GB)

(73) Assignee: Camcon Auto Limited, Cambridge (GB)

( * ) Notice: Subject to any disclaimer, the term of this patent is extended or adjusted under 35 U.S.C. 154(b) by 0 days.

(21) Appl. No.: 16/651,895

(22) PCT Filed: Nov. 5, 2018

(86) PCT No.: PCT/GB2018/053204
§ 371 (c)(1),
(2) Date: Mar. 27, 2020

(87) PCT Pub. No.: WO2019/092406
PCT Pub. Date: May 16, 2019

(65) Prior Publication Data
US 2020/0263570 A1 Aug. 20, 2020

(30) Foreign Application Priority Data
Nov. 7, 2017 (GB) .................................. 1718402.9

(51) Int. Cl.
*F01L 1/18* (2006.01)
*F01L 1/20* (2006.01)
*F16H 21/44* (2006.01)

(52) U.S. Cl.
CPC ............... *F01L 1/181* (2013.01); *F01L 1/205* (2013.01); *F16H 21/44* (2013.01)

(58) Field of Classification Search
CPC ............... F01L 1/181; F01L 1/30; F01L 1/46
(Continued)

(56) References Cited

U.S. PATENT DOCUMENTS

| 1,227,812 A | * | 5/1917 | MacPherson | ............. F01L 1/30 123/90.24 |
| 1,238,263 A | | 8/1917 | Chevrolet | |

(Continued)

FOREIGN PATENT DOCUMENTS

| EP | 2860362 A1 | 4/2015 |
| GB | 482044 A | 3/1938 |

(Continued)

OTHER PUBLICATIONS

Machine-generated English language translation of Japan Patent Publication No. JP S61-226507 A, European Patent Office, dated Oct. 8, 1986.
(Continued)

*Primary Examiner* — Jorge L Leon, Jr.
(74) *Attorney, Agent, or Firm* — Dascenzo Gates Intellectual Property Law, P.C.

(57) ABSTRACT

A linkage for coupling between an actuator and a valve in an engine valve actuation assembly. The linkage provides some compliance in the operation of the linkage to close the valve. The linkage comprises a rocker having a rigid body portion, the body portion including a pivot axis about which it is rotatable, and a link mount for coupling to a valve link arm. The link mount is moveable from a rest position relative to the body portion, and the link mount is urged back towards its rest position when displaced from its rest position relative to the body portion.

12 Claims, 5 Drawing Sheets

(58) Field of Classification Search
USPC .................... 123/90.24, 90.25, 90.26, 90.39
See application file for complete search history.

(56) References Cited

U.S. PATENT DOCUMENTS

| | | | | |
|---|---|---|---|---|
| 6,053,134 | A | * | 4/2000 | Linebarger .............. F01L 1/185 |
| | | | | 123/90.16 |
| 2016/0153323 | A1 | * | 6/2016 | Stone ........................ F01L 1/30 |
| | | | | 123/90.24 |
| 2017/0030231 | A1 | | 2/2017 | Jeon et al. |

FOREIGN PATENT DOCUMENTS

| | | |
|---|---|---|
| JP | S61-226507 A | 10/1986 |
| WO | WO 2004/097184 | 11/2004 |
| WO | WO 2014/068365 A1 | 5/2014 |

OTHER PUBLICATIONS

Machine-generated English language translation of European Patent Publication No. EP 2860362, European Patent Office, dated Apr. 15, 2015.

Search Report issued in connection with United Kingdom Patent Application No. GB 1718402.0, 1 page, United Kingdom Intellectual Property Office, dated Apr. 23, 2018.

* cited by examiner

ACTUATION ASSEMBLY AND METHODS OF OPERATION THEREOF

FIELD OF THE DISCLOSURE

The present disclosure relates to a linkage of an actuation assembly suitable for operating a valve, for example. More particularly, it is concerned with actuation assemblies which operate in a desmodromic manner.

BACKGROUND OF THE DISCLOSURE

Desmodromic actuation assemblies have been developed for reciprocating engine valves, to positively drive the valve between open and closed positions. For example, WO2004/097184 discloses a desmodromic valve actuation assembly in which cams mounted on the rotor of a rotary electromagnetic actuator are coupled to a valve by a desmodromic linkage.

SUMMARY OF THE DISCLOSURE

The present disclosure provides a linkage for coupling between an actuator and a valve stem in an engine valve actuation assembly, the linkage comprising a rocker having (a) a rigid body portion, the body portion including a pivot axis about which it is rotatable, and (b) a link mount for coupling to a valve link arm, wherein the link mount is moveable from a rest position relative to the body portion, and the link mount is urged back towards its rest position when displaced from its rest position relative to the body portion.

This disclosure describes incorporation of compliance into a rocker of a linkage provided between an actuator and a component to be moved by the actuator, such as a valve stem having a valve head which is brought into contact with a valve seat. This compliance may allow for manufacturing tolerances and effects of thermal deformation and wear. This may avoid overloading of components of the linkage. It may also ensure that a component actuated by the linkage is positively held at one end of its travel by a biasing force generated by the compliance in the rocker. These benefits may be achieved in accordance with the present disclosure in a linkage arrangement having relatively low inertia and in a compact manner.

The link mount may be moveable from the rest position relative to the body portion by a torque exerted on the body portion to rotate the body portion in a first direction about the pivot axis while a torque is exerted on the link mount in a second opposite direction.

The link mount may be moveable from the rest position relative to the body portion when opposite torques about the pivot axis are exerted on the body portion and link mount, respectively, which act to pull them apart.

Such forces may be exerted on the rocker during closing of a valve coupled to the rocker when the valve head has come into contact with the valve seat, for example.

Furthermore, the link mount may be immoveable from the rest position relative to the body portion by a torque exerted on the body portion to rotate the body portion in the second direction while a torque is exerted on the link mount in the first direction.

The link mount may remain in the rest position relative to the body portion when opposite torques about the pivot axis are exerted on the body portion and link mount, respectively, which act to push them together.

Such forces may be exerted on the rocker during opening of a valve coupled to the rocker, for example.

The link mount may remain in its rest position relative to the body portion when the body portion is rotated in one direction in order to exert a force on a component coupled to the link mount (for example to push a valve stem to open a valve of which the valve stem forms a part), and be compliantly located relative to the body portion during rotation in the opposite direction, such that a net torque exerted on the link mount (that is, the difference between the torques exerted on the body portion and the link mount) above a predetermined threshold moves the link mount away from its rest position (for example when pulling a valve head against a valve seat during closing of the valve).

When the linkage is installed in a system, the rocker may be mounted on a supporting structure so as to be rotatable relative to the supporting structure about its pivot axis.

It will be appreciated that the rest position of the link mount relative to the body portion is the position adopted by the link mount relative to the body portion when no net force is acting on the link mount to move it towards or away from the body portion.

In a preferred example, the link mount is coupled to the body portion by a resilient coupling which urges the link mount towards its rest position when the link mount is displaced from its rest position relative to the body portion.

The resilient coupling may be integrally formed with the rigid body portion. A material forming the resilient coupling and rigid body portion may be selected and shaped so as to provide sufficient rigidity in the rigid body portion and a desired compliance in the resilient coupling. Alternatively, the resilient coupling may comprise a coupling member formed of resilient material, which is a component separate from the body portion and fixed onto the body portion.

The linkage may include an abutment which prevents the link mount moving closer to the body portion than its rest position. In this way, the rocker may be effectively rigid, rather than compliant, when a force is exerted on the link mount in a direction urging it closer to the body portion. As a result, the rocker is relatively stiff when exerting a pushing force via its link mount.

Preferably, the link mount is biased towards its rest position such that a force greater than a predetermined threshold is required to displace the link mount from its rest position relative to the body portion. In this configuration, the link mount is only displaced from its rest position (as permitted by the compliance of the rocker) when a force greater than a predetermined threshold is exerted on the link mount in a direction which pulls the link mount away from the body portion. In one example, the resilient coupling may exert a biasing force on the link mount when it is in its rest position such that a force greater than a predetermined threshold is required to displace the link mount from its rest position relative to the body portion.

The linkage may include a pre-load adjuster for adjusting the predetermined threshold force to suit a particular application.

In a further example, the linkage includes a stop for preventing displacement of the link mount away from its rest position relative to the body portion by more than a predetermined maximum displacement. The linkage may include a stop adjuster for adjusting the predetermined maximum displacement.

The linkage may be deployed in an engine valve actuation assembly which includes an actuator coupled to the rocker of the linkage in order to drive oscillating rotation of the rocker about its pivot axis. Such an assembly may be included in an internal combustion engine to actuate a poppet valve of an engine cylinder.

The present disclosure also provides a method of closing a valve using an engine valve actuation assembly as disclosed herein, wherein the link mount is coupled to a valve link arm which is in turn coupled to a valve head which closes onto a valve seat, the method comprising the steps of: operating the actuator to rotate the rocker in one direction so that the link mount pulls on the valve link arm until the valve head is brought into engagement with the valve seat; and operating the actuator to rotate the rocker further in the one direction such that the link mount is displaced from its rest position relative to the body portion. As a result of this further rotation and displacement of the link mount from its rest position, the linkage urges the valve head against the valve seat to ensure that it is reliably and fully seated in position.

In examples described herein, a resilient coupling is provided which is extended when the link mount moves away from its rest position. It will be appreciated that in other examples, the rocker may be configured in such a way that a resilient coupling is compressed when the link mount moves away from its rest position, so that the compressed resilient coupling exerts a force on the link mount which urges it back towards its rest position.

BRIEF DESCRIPTION OF THE DRAWINGS

Examples of the present disclosure will now be described by way of example and with reference to the accompanying schematic drawings, wherein.

DETAILED DESCRIPTION OF THE DRAWINGS

The drawings show rockers 2 which include a rigid body portion 4. The rigid body portion is rotatable about a pivot axis 6 which extends perpendicular to the plane of the drawings. Each rocker also includes a link mount 8 (spaced from the pivot axis) for coupling to a component to be driven by the rocker. In the example shown in the drawings, the link mount is embodied by an opening for receiving a connector for coupling it to a component to be moved by the rocker.

The link mount is defined towards a distal end 14 of a compliant section 10 of the rocker, which forms a resilient coupling structure between the link mount and the rigid body portion. This section is elongated in the plane of the drawing (that is, perpendicular to the pivot axis) and joined to the body portion 4 at proximal end 11. It is integrally formed with the body portion.

The material forming the body portion and the compliant section of the rocker is selected together with the profile of the compliant section to give the desired degree of compliance in the rocker. The material should also have sufficient strength to provide the desired properties and durability within its fatigue limits. A suitable material may be spring steel for example. Sufficient force acting on the link mount to pull it away from the body portion will tend to bend the compliant section away from the body portion. Resilience of the material of the compliant section will tend to urge the link mount back towards the body portion.

Figure 1:
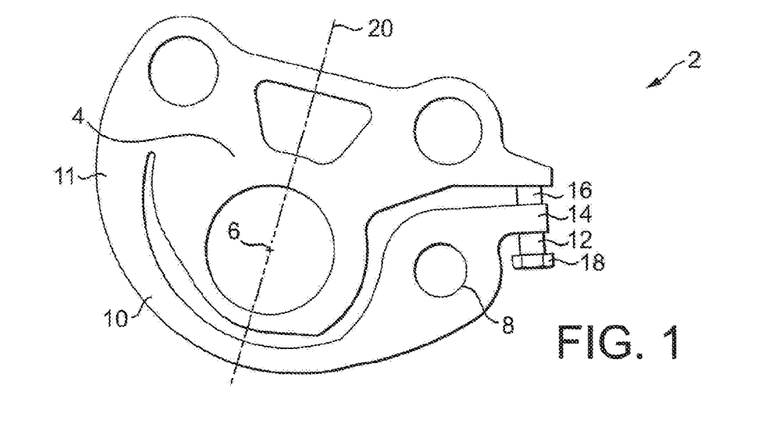
FIGS. 1 to 3 are side views of a rocker of a linkage according to an example of the present disclosure, showing the rocker in different configurations and orientations in use.
Figure 2:
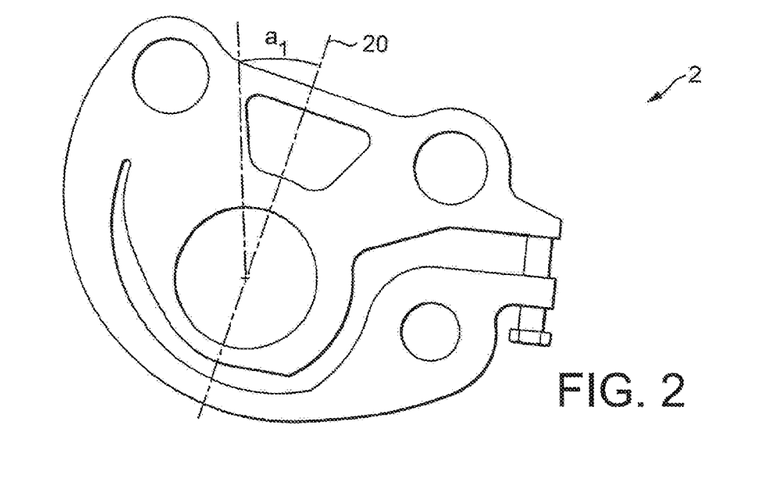
Figure 3:
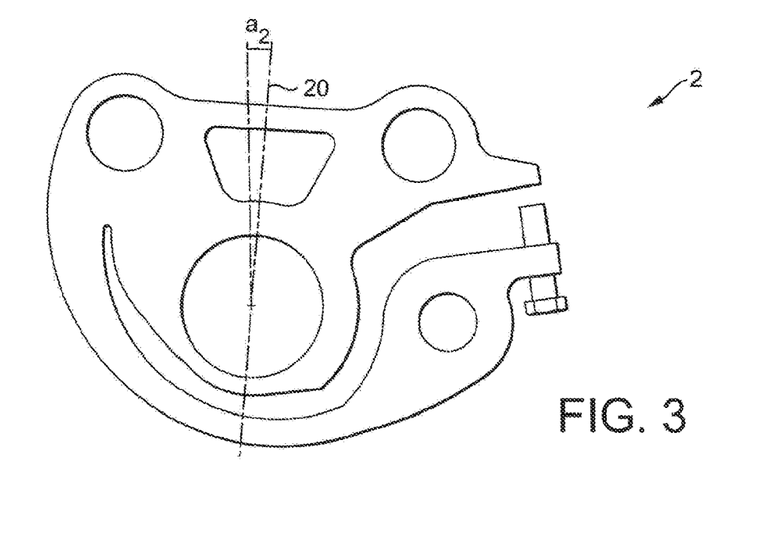

The rocker shown in FIGS. 1 to 3 includes a pre-load arrangement 12. In the example illustrated, this is provided by an adjuster bolt. The bolt has a thread which is in engagement with a complementary thread formed in an opening which passes through a distal end 14 of the compliant section 10. The end 16 of the bolt opposite to is its head 18 is in engagement with part of the body portion. Rotation of the bolt therefore increases or decreases the spacing between the distal end 14 of the compliant section 10 and the body portion, and so adjusts a biasing force exerted by the compliant section on the bolt which urges it against the body portion. This in turn varies the magnitude of the force on the link mount 8 needed to deform the compliant section more so as to move the compliant section further away from the body portion.

The pre-load arrangement is adjusted in use to give a desired load on the compliant section, such that a force pulling the link mount away from the rigid body portion of the rocker will only displace the link mount away from the body portion when the force exceeds a pre-set value.

In the rocker shown in FIG. 1, the bolt 12 rests in contact with the body portion, but is not exerting a significant force or pre-load on the compliant section 10. In FIG. 2, the bolt has been rotated so that a greater length of the bolt extends away from the compliant section, towards the body portion. As a result, the distal end of the compliant section has been displaced away from the body portion, providing a pre-load on the compliant section.

Instead of the adjuster bolt, a stop or spacer having a fixed, predetermined length may be carried by the compliant section or the body portion to provide the desired pre-load on the compliant section.

FIGS. 2 and 3 show the rocker 2 in two different orientations relative to its pivot axis 6.

In FIG. 2, an angle $a_1$ is defined between a vertical line in FIG. 2 and a centre line 20 of the rocker. When the rocker is rotated clockwise, the rigid body portion 4 exerts a force on the link mount 8 via the adjuster bolt 12. During rotation in the clockwise direction, the rocker does not exhibit any compliance and all rotation of the body portion is transferred to the link mount 8. In an example where the link mount of the rocker is coupled to a valve, this motion may be employed to open the valve.

In FIG. 3, the rocker has been driven anti-clockwise relative to its orientation in FIG. 2. It can be seen that the angle $a_2$ to the vertical defined by its centre line is smaller than the angle $a_1$. This rotation causes the rocker to exert a pulling force on the link mount 8. If motion of the link mount anti-clockwise around pivot axis 6 is resisted by components coupled to the link mount, this will tend to exert a force on the link mount in a direction away from the body portion 4. If this force exceeds the force urging the compliant section towards the body portion due to the resilience of the compliant section, the adjuster bolt will lift away from the body portion as shown in FIG. 3. As a result, the rocker exerts a biasing force on the components connected to the link mount 8. In an example where the link mount is coupled to a valve, this biasing force will serve to hold the valve head against its valve seat.

Figure 4:
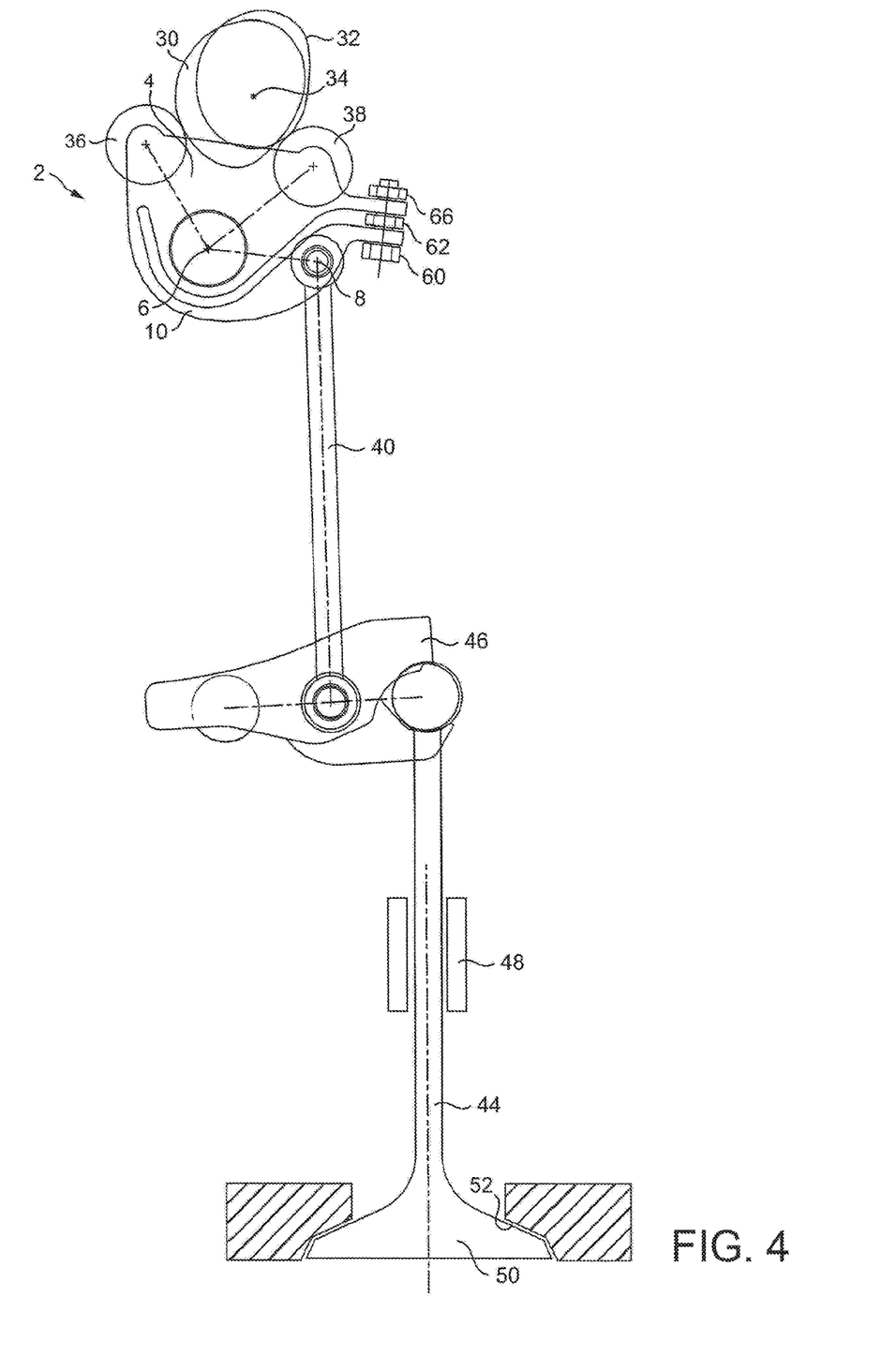
FIGS. 4 and 5 are side views of a linkage according to another example of the present disclosure, which is provided between two actuation cams and an engine valve.
Figure 5:
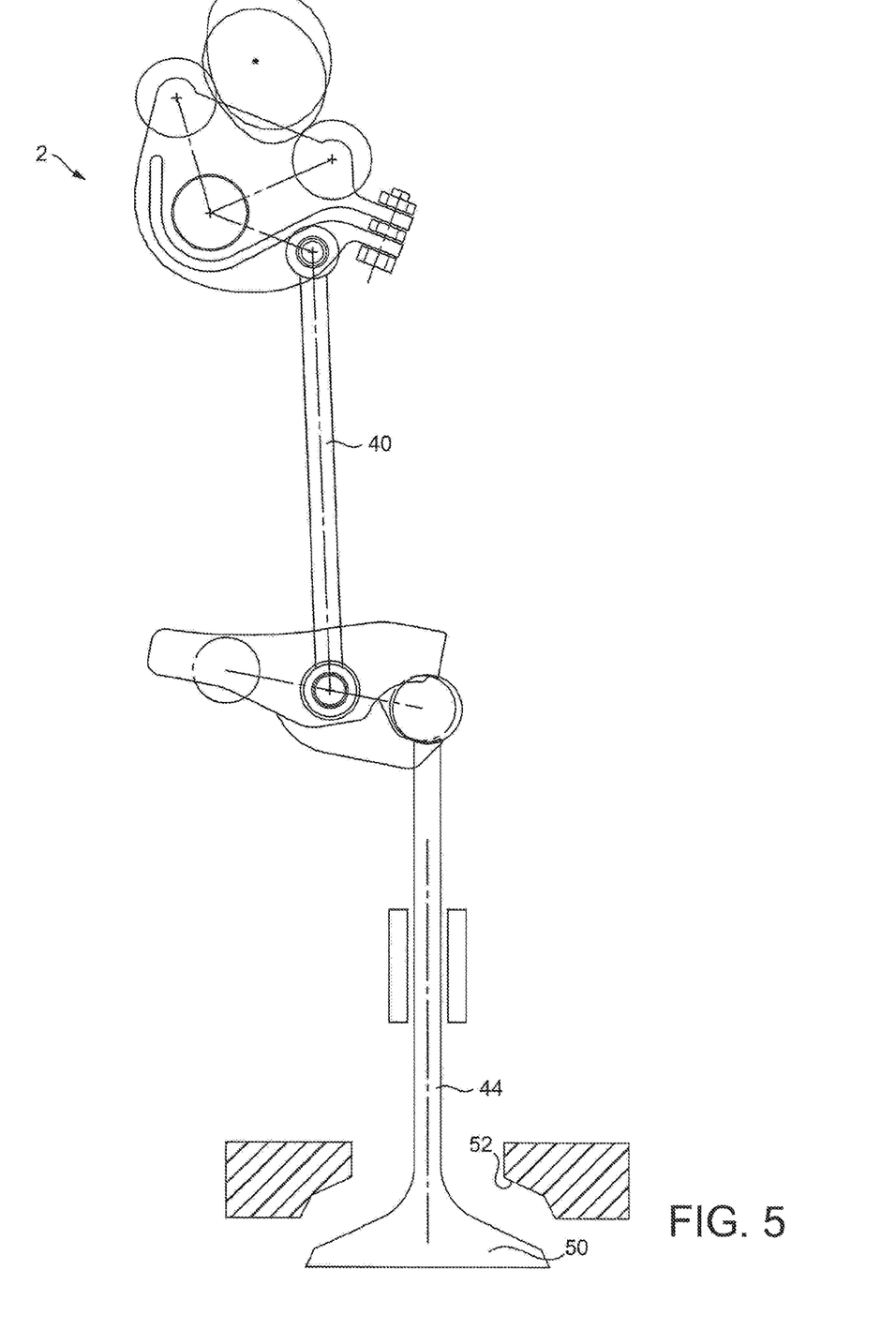
Figure 6:
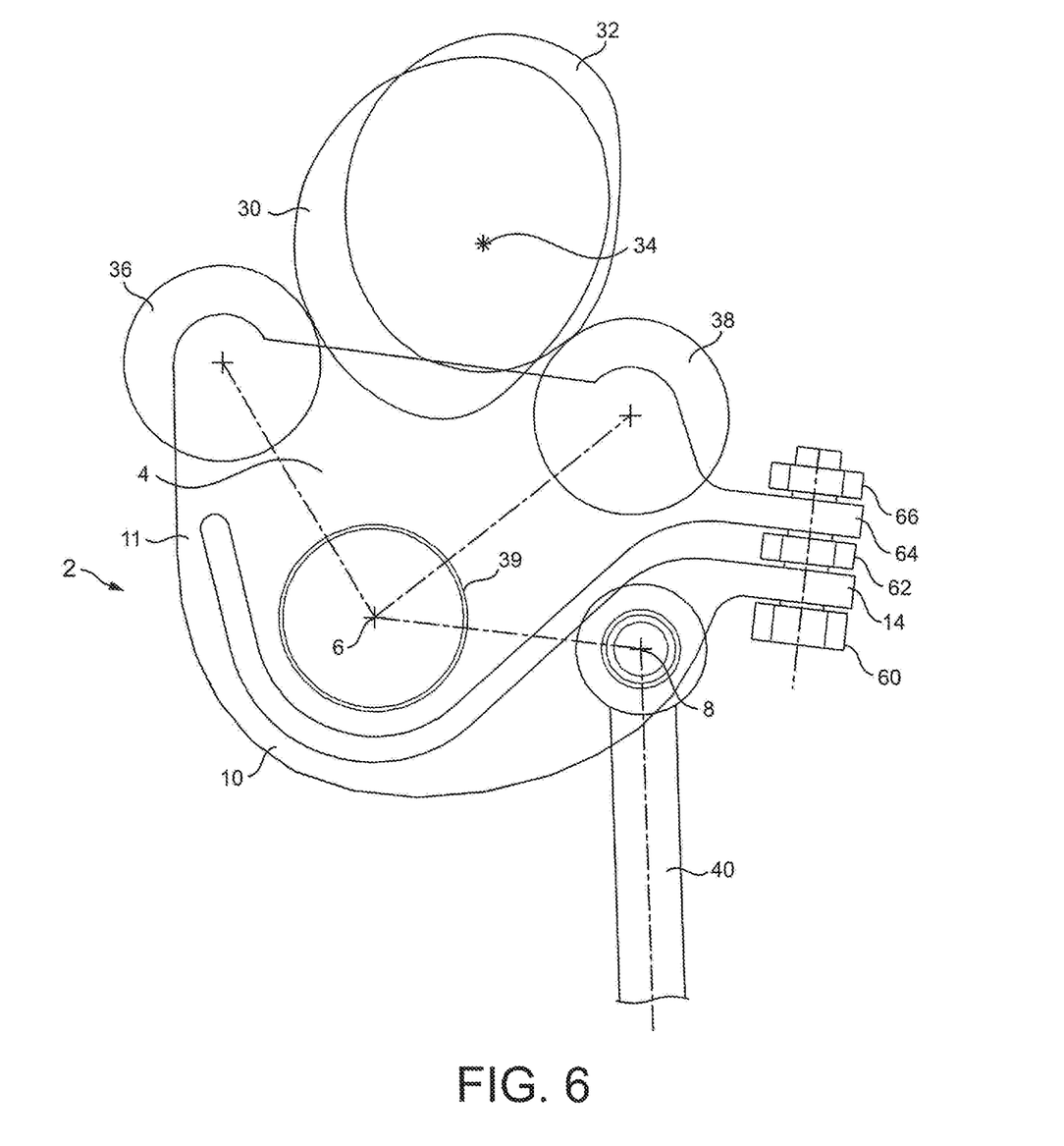
FIGS. 6 and 7 are an enlarged side view and a rear perspective view, respectively, of the rocker shown in FIGS. 4 and 5.

The example of a linkage according to the present disclosure shown in FIGS. 4 and 5 is illustrated in combination with further components of a valve actuation assembly. An enlarged view of the rocker depicted in FIGS. 4 and 5 is shown in FIG. 6, and a rear perspective view is provided in FIG. 7.

In these illustrations, a pull cam 30 and push cam 32 are shown which are used to drive the rocker. The cams are rotatable about a common axis 34 which extends perpendicular to the plane of the drawing. A rotary actuator (not shown) drives rotation of the cams about this axis.

Figure 7:
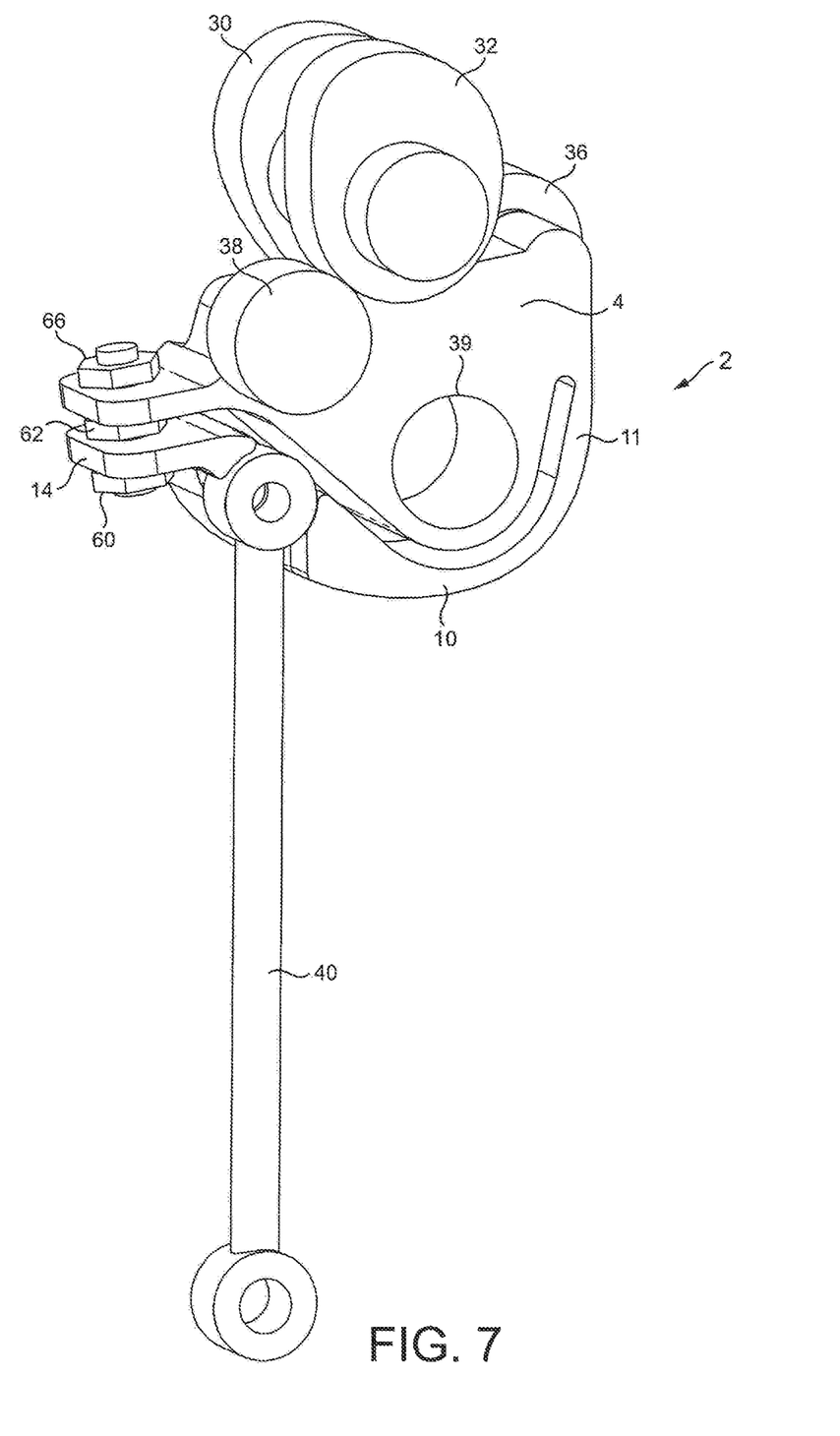

Two rollers are rotatably mounted on the rocker 2. Roller 36 is a closing roller and is in engagement with the pull cam 30. Roller 38 is an opening roller and is in engagement with the push cam 32. It will be appreciated that each cam and roller combination is spaced apart in a direction parallel to the axis 34, as can be seen in FIG. 7. It will also be appreciated that, instead of rollers, other cam following structures may be employed, such as flat or curved followers.

The rigid body portion rigidly interconnects the cam followers and the part of the rigid body which defines the location of the pivot axis 6 (for example circular opening 39 in FIG. 4 which is centred on the pivot axis 6). The rigid body portion may be integrally formed as a single component or may be formed from a plurality of interconnected components.

In the example of FIG. 4, link mount 8 is coupled to a link arm 40. Link arm 40 is in turn coupled to a valve stem 44 by a pivotable coupling 46. Valve stem 44 is constrained to reciprocate in a linear manner by a sleeve 48. The valve stem includes a valve head 50 for engagement with a valve seat 52.

In the configuration of FIG. 4, the valve is closed, with valve head 50 in engagement with its valve seat 52. When the cams 30, 32 are rotated clockwise (when viewed in the direction shown in FIG. 4) about their axis of rotation 34, the increasing radius of push cam 32 causes the cam to push against roller 38. This exerts a torque in a clockwise direction on rocker 2 about its axis of rotation 6. As a result, link mount 8 exerts a pushing force on link arm 40 causing the valve to open, as shown in FIG. 5. Continued rotation of the cams 30, 32 leads to pull cam 30 exerting a force on the closing roller 36. This generates a torque on the rocker around its axis of rotation 6 in an anti-clockwise direction, causing the link mount to exert a pulling force on link arm 40 in a direction which closes the valve.

The degree of compliance exhibited by the rocker is selected so as to give sufficient stiffness to ensure reliable control of the valve during closing motion, whilst providing the required compliance once the valve head is in engagement with the valve seat.

The example of FIGS. 4 to 7 uses a modified version of the pre-load arrangement 12 shown in FIGS. 1 to 3. In addition to the pre-load function, this arrangement also defines a maximum distance to which the compliant section 10 can be moved away from the body portion 4 of the rocker. An extended adjuster bolt 60 passes through both the compliant section 10 and the rocker body portion 4. A first nut 62 is threaded onto the bolt 60 and located between the compliant section and body portion 4. The amount of pre-load on the compliant section is adjusted by adjusting the position of nut 62 along adjuster bolt 60 with the surface of the nut adjacent to the body portion defining a stop. The selected location of the nut along the bolt may be maintained by use of a tight thread or by fixing it in position using a bonding agent for example. The bolt then extends through an opening 64 in the body portion. The diameter of the opening is such that the bolt is able to move freely through the opening. A second nut 66 is located towards the distal end of the bolt, on the opposite side of the body portion to nut 62. Nut 66 serves to limit the extent to which the compliant section is able to move away from the body portion. Again the position of nut 66 along the bolt 60 may be adjusted as required, with the nut then held in the selected position by use of a tight thread or a bonding agent for example.

In the illustrated examples, the compliant section 10 of the rocker is integrally formed with the body portion 4. They may be formed by stamping or machining the desired shape from metal or by casting metal, for example.

It will be appreciated that the desired compliant and resilient coupling between the link mount and the body portion could instead be provided by a separate coupling member which has the link mount at one end and is fixed onto the body portion at its other end. This member could be formed of spring steel, for example.

The invention claimed is:

1. A linkage for coupling between an actuator and a valve stem in an engine valve actuation assembly, the linkage comprising:
  a rocker having (a) a rigid body portion, the body portion including a pivot axis about which the body portion is rotatable, and (b) a link mount configured to be coupled to a valve link arm,
  wherein the rocker is configured such that the link mount is able to move from a rest position relative to the body portion,
  wherein the link mount is coupled to the body portion by a resilient coupling which urges the link mount towards the rest position when the link mount is displaced from the rest position,
  wherein the rocker is configured such that the link mount moves from the rest position when a torque is exerted on the body portion by a pull cam so as to rotate the body portion in a closing direction about the pivot axis while a torque is exerted on the link mount by the valve link arm in an opposite opening direction, and
  wherein the rocker is configured such that the link mount remains in the rest position when a torque is exerted on the body portion by a push cam so as to rotate the body portion in the opening direction while a torque is exerted on the link mount by the valve link arm in the closing direction.

2. The linkage of claim 1, wherein the resilient coupling is integrally formed with the rigid body portion.

3. The linkage of claim 1, wherein the resilient coupling comprises a coupling member formed of resilient material.

4. The linkage of claim 1, further including an abutment which prevents the link mount moving closer to the body portion than the rest position.

5. The linkage of claim 1, wherein the link mount is biased towards the rest position such that a force greater than a predetermined threshold is required to displace the link mount from the rest position.

6. The linkage of claim 5, wherein the resilient coupling exerts a biasing force on the link mount when the link mount is in the rest position.

7. The linkage of claim 5, further including a pre-load adjuster configured to enable adjustment of the predetermined threshold.

8. The linkage of claim 1, further including a stop configured to prevent displacement of the link mount away from the rest position by more than a predetermined maximum displacement.

9. The linkage of claim 8, further including a stop adjuster configured to enable adjustments of the predetermined maximum displacement.

10. An engine valve actuation assembly including the linkage of claim 1 and an actuator coupled to the rocker of the linkage.

11. An internal combustion engine including the engine valve actuation assembly of claim 10.

12. A method of closing a valve using the engine valve actuation assembly of claim 10, wherein the link mount is coupled to the valve link arm which is further coupled to a valve head of the valve, the method comprising:
- operating the actuator so as to rotate the rocker in the closing direction such that the link mount pulls on the valve link arm until the valve head is brought into engagement with a valve seat; and
- operating the actuator so as to rotate the rocker further in the closing direction such that the link mount is displaced from the rest position.

* * * * *